US008567969B2

(12) United States Patent
Thomas et al.

(10) Patent No.: US 8,567,969 B2
(45) Date of Patent: Oct. 29, 2013

(54) BI-POLYMER INFRARED OPTICS FOR HIGH-G APPLICATIONS

(75) Inventors: John A. Thomas, Tucson, AZ (US); Thomas H. Lind, Tucson, AZ (US); Ronald L. Roncone, Vail, AZ (US); Gary H. Johnson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 13/370,543

(22) Filed: Feb. 10, 2012

(65) Prior Publication Data
US 2013/0208367 A1 Aug. 15, 2013

(51) Int. Cl.
*G02B 7/182* (2006.01)
*G02B 17/00* (2006.01)

(52) U.S. Cl.
USPC ............................ 359/850; 359/365; 359/730

(58) Field of Classification Search
USPC .......... 359/365, 366, 729–731, 811, 819, 850
See application file for complete search history.

(56) References Cited

U.S. PATENT DOCUMENTS

| 5,760,979 A | 6/1998 | Saito |
| 6,449,103 B1 * | 9/2002 | Charles ........................ 359/725 |
| 6,606,066 B1 | 8/2003 | Fawcett et al. |
| 2006/0245046 A1 | 11/2006 | Bergeron et al. |
| 2011/0176205 A1 | 7/2011 | Shaw et al. |

FOREIGN PATENT DOCUMENTS

GB 630653 A 10/1949

* cited by examiner

*Primary Examiner* — William Choi
(74) *Attorney, Agent, or Firm* — Lando & Anastasi, LLP

(57) ABSTRACT

Optical systems configured to withstand operation in high acceleration and varying temperature environments, and methods of assembling the same. In one example, an imaging optical apparatus includes a primary minor made of an unreinforced polymer, a secondary mirror made of the unreinforced polymer and optically coupled to the primary minor, a field lens optically coupled to the secondary minor, and a strut having a plurality of cross-struts and mounting features configured to mount the primary minor, the secondary mirror and the field lens. In some examples, the imaging optical apparatus further includes an outer retainer disposed behind the primary minor and coupled to the strut, and an inner retainer disposed behind the field lens and coupled to the strut, the outer and inner retainers configured to structurally support the primary minor and the field lens and to accommodate deflections of the primary minor.

16 Claims, 11 Drawing Sheets

BI-POLYMER INFRARED OPTICS FOR HIGH-G APPLICATIONS

FEDERALLY SPONSORED RESEARCH

This invention was made with government support under Grant No. W15QKN-08-C-0054 awarded by the U.S. Department of Defense. The U.S. government has certain rights in this invention.

BACKGROUND

Imaging infrared optical systems of a cassegrain or catadioptric form for use in gun-launched applications benefit from low mass components. However, the typical material for the minors and for the structure of the assemblies of these optical systems is aluminum, which requires expensive machining to reach adequate accuracies. For example, current implementations of gun-launched imaging infrared optics are assembled from conventionally machined aluminum optical components which are both labor and equipment intensive, thereby increasing cost. Resulting designs are not lightweight enough, nor inexpensive enough, and therefore do not meet the low cost and low mass requirements for such imaging systems.

Previous design attempts reduce mass and cost by molding fiber-reinforced polymer mirrors, but the resulting surface finish is not adequate for use as a minor surface due to the presence of the reinforcing fibers. On the other hand, design attempts with unreinforced polymers have adequate surface finish, but do not have adequate strength for use in gun-launched systems. For example, Ultem® is an amorphous thermoplastic polyetherimide (PEI) material manufactured by SABIC Innovative Plastics, and used as a polymer mirror material. Previous attempts also suffer performance loss from distortion of the optics at high temperature. Optical distortion at high temperature is due to the difference in coefficients of thermal expansion (CTE) of multiple materials used in the optical system design, as well as due to the difference in CTE between the materials used in the optical system design and the material of an external platform to which the optical system mounts.

For example, mirrors molded from a milled glass-filled Ultem® material are stiff enough to survive launch shock and close enough in CTE to an external aluminum gimbal platform such that thermal distortion would be fairly minimal. However, surface roughness characterization results reveal that as-molded, filled Ultem® polymers are extremely poor candidates for mirror substrates, as their surface roughness is far too high to yield a precision optic. On the other hand, surface roughness characterization reveals that unfilled Ultem® is a fine optical substrate material. However, without the filler, the polymer has a much larger CTE as well as lower stiffness and strength. Therefore, mounting distortion over temperature would result in drastically reduced minor performance, and stress levels during launch shock could induce structural failure.

SUMMARY OF INVENTION

Aspects and embodiments relate to optical systems, and more specifically to low cost and low mass infrared (IR) optical systems that can withstand operation in high acceleration (high G) and varying temperature environments, such as gun-launched applications, without sacrificing optical quality. Aspects and embodiments address issues identified with previous designs while maintaining a high level of moldability and a relatively low level of assembly complexity.

In one example, aspects of the systems and methods discussed herein may provide an imaging infrared optical system for low cost gun-launched multi-mode seekers for various applications. Embodiments may provide imaging optical systems that operate at infrared or other wavelengths, and may operate as hyperspectral sensors. In other examples, embodiments may provide very low cost and low mass multi-mode capable seekers for small unmanned aerial vehicles (UAV), or imaging optical systems for surveillance on small UAV platforms. At least some aspects and embodiments discussed herein are directed to applications where a low cost and low mass gimbaled seeker is used. For example, some embodiments may be used in missiles where it may be necessary for the system to withstand high-G turns, temperature variations and other stresses associated with being located on an aircraft wing or other outer surface, or flight of the missile. In other examples, embodiments may provide low cost and low weight IR (or other wavelength) surveillance systems for law enforcement or border patrol applications, or vehicle roof-mounted imaging systems for use in vehicular applications.

According to one embodiment, an imaging optical apparatus comprises a primary minor made of an unreinforced polymer, a secondary minor made of the unreinforced polymer and optically coupled to the primary mirror, a field lens optically coupled to the secondary mirror, and a strut having a plurality of cross-struts and mounting features configured to mount the primary minor, the secondary mirror and the field lens. In some embodiments, the strut may be made of a reinforced polymer. The imaging optical apparatus may further comprise an outer retainer disposed behind the primary mirror and coupled to the strut, and an inner retainer disposed behind the field lens and coupled to the strut, the outer and inner retainers configured to structurally support the primary minor and the field lens and to accommodate deflections of the primary mirror. In some examples, the strut, the outer retainer and the inner retainer may be made of a reinforced polymer. In one example, the unreinforced polymer is unfilled polyetherimide plastic and the reinforced polymer is carbon-fiber filled polyetherimide plastic. The field lens may be made of germanium. In some examples, a reinforcing material to polymer proportion of the reinforced polymer is selected to reduce mismatch between a coefficient of thermal expansion (CTE) of the reinforced polymer and a CTE of the unreinforced polymer.

According to certain embodiments, each of the primary mirror, the secondary minor and the field lens may be bonded to the strut using room temperature vulcanized (RTV) bonds and each of the outer retainer and the inner retainer may be bonded to the strut with structural adhesive bonds. The structural adhesive may be epoxy adhesive.

The primary mirror may further comprise a plurality of outer lobes configured to increase a collecting area of the primary minor, each of the plurality of outer lobes being isolated from the strut. The primary mirror may further comprise an inner edge within the primary mirror, the primary mirror being bonded to the strut at the inner edge. Embodiments may further comprise a plurality of mechanical stop features formed on each of the strut and the primary minor to limit deflections of the primary mirror, the plurality of stop features of the primary minor being disposed between the plurality of stop features of the strut and the outer retainer. In some examples, each of the plurality of stop features of the primary minor further includes a set-forward stop feature to limit forward axial deflection and a set-back stop feature to limit backward axial deflection. In some embodiments, the primary mirror may be disposed relative to the strut and the outer retainer to form a plurality of forward gaps between the plurality of set-forward stop features of the primary minor and the plurality of stop features of the strut and a plurality of backward gaps between the plurality of set-back stop features of the primary mirror and the outer retainer. In some embodiments, the primary mirror may include a protrusion formed at a radius between the inner edge and the plurality of outer lobes of the primary minor, the protrusion being configured to form the plurality of stop features of the primary minor to limit deflections of the outer lobes.

In another example, the primary mirror has a first coefficient of thermal expansion (CTE), the strut has a second CTE, and the field lens has a third CTE, the first CTE being higher than the second CTE and the second CTE being higher than the third CTE. The primary mirror may further comprise an inner edge within the primary minor, the primary mirror being bonded to the strut at the inner edge. The RTV bonds between the inner edge of the primary mirror and the strut may be configured to athermalize the interface between the inner edge of the primary mirror and the strut, and the RTV bonds between the field lens and the strut may be configured to athermalize the interface between the field lens and the strut.

The strut may further comprise at least one primary baffle feature disposed between the field lens and the secondary mirror and configured to block stray light. The strut mounting features may include a mounting feature for the secondary mirror, and the strut may further comprise at least one secondary baffle feature disposed between the secondary mirror and the mounting feature for the secondary minor and configured to block stray light. In some embodiments, the strut may further comprise at least one interface mount to attach the imaging optical apparatus to an external platform. The interface mount may be disposed such that the primary mirror is isolated from the external platform. The external platform may be a gimbal platform. The external platform may be made of metal. In some embodiments, the strut may be made of a first material and an external platform may be made of a second material, the strut further having compliant structural connections between an interface mount and the mounting features of the strut to limit distortion of the optics.

In some embodiments, the outer retainer may be disposed relative to the primary minor to form a gap between the outer retainer and the primary minor. The inner retainer may be disposed relative to the primary mirror to form a gap between the inner retainer and the primary mirror. In one example, the strut is a one-piece molded component. The strut may be configured such that the primary minor, the secondary minor and the field lens are arranged in at least one of a catadioptric and a cassegrain configuration along an optical axis of the imaging optical apparatus. In some examples, the secondary mirror has a diameter that is smaller than a maximum distance between adjacent cross-struts to allow mounting the secondary minor through the strut.

Aspects and embodiments also provide methods of assembling imaging optical systems disclosed herein. According to one embodiment, a method comprises molding a primary mirror from an unreinforced polymer, molding a secondary minor from the unreinforced polymer, molding each of an outer retainer and an inner retainer, and molding a one-piece strut having a plurality of cross-struts and mounting features for the primary mirror, the secondary minor and the field lens. The method may further include inserting each of the primary minor, the secondary mirror and the field lens into the mounting features of the strut such that the secondary minor is optically coupled to the primary minor and the field lens is optically coupled to the secondary mirror aligning each of the primary mirror, the secondary mirror and the field lens with the mounting features of the strut to meet centration tolerances. The method may further include bonding each of the primary mirror, the secondary mirror and the field lens to the strut, placing the outer retainer behind the primary minor; placing the inner retainer behind the field lens, and bonding each of the outer retainer and the inner retainer to the strut.

In one example, molding the one-piece strut includes optimizing the mold to meet axial tolerances of the mounting features for the primary mirror, the secondary minor and the field lens. Molding each of the one-piece strut, the outer retainer and the inner retainer may further include molding each of the one-piece strut, the outer retainer and the inner retainer from a reinforced polymer. In one example, molding the one-piece strut includes pulling two mold halves away from each other in the axial direction. In another example, molding the one-piece strut includes enhancing the mold to add stray light blocking performance. Molding the one-piece strut may further comprise molding at least one baffle feature to block stray light. In one example, molding the one-piece strut includes molding a plurality of stop features to limit deflection of the primary minor. In another example, molding the one-piece strut includes molding at least one interface mount to connect the apparatus to at least one external platform.

According to some examples, inserting the secondary minor includes inserting the secondary mirror radially through a secondary insertion gap between adjacent cross-struts. Aligning the secondary minor may further comprise controlling the axial position of the secondary mirror using an axial reference flat assembly. In one example, aligning the secondary mirror includes applying a combination of shim-to-center and active alignment fixturing methods to achieve precision alignment. Bonding each of the primary minor, the secondary minor and the field lens to the strut may further comprise bonding using RTV bonds. Bonding each of the outer retainer and the inner retainer to the strut may further comprise bonding using structural adhesive bonds. The structural adhesive may be epoxy adhesive. Bonding each of the outer retainer and the inner retainer to the strut may comprise ultrasonic welding or chemical welding.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
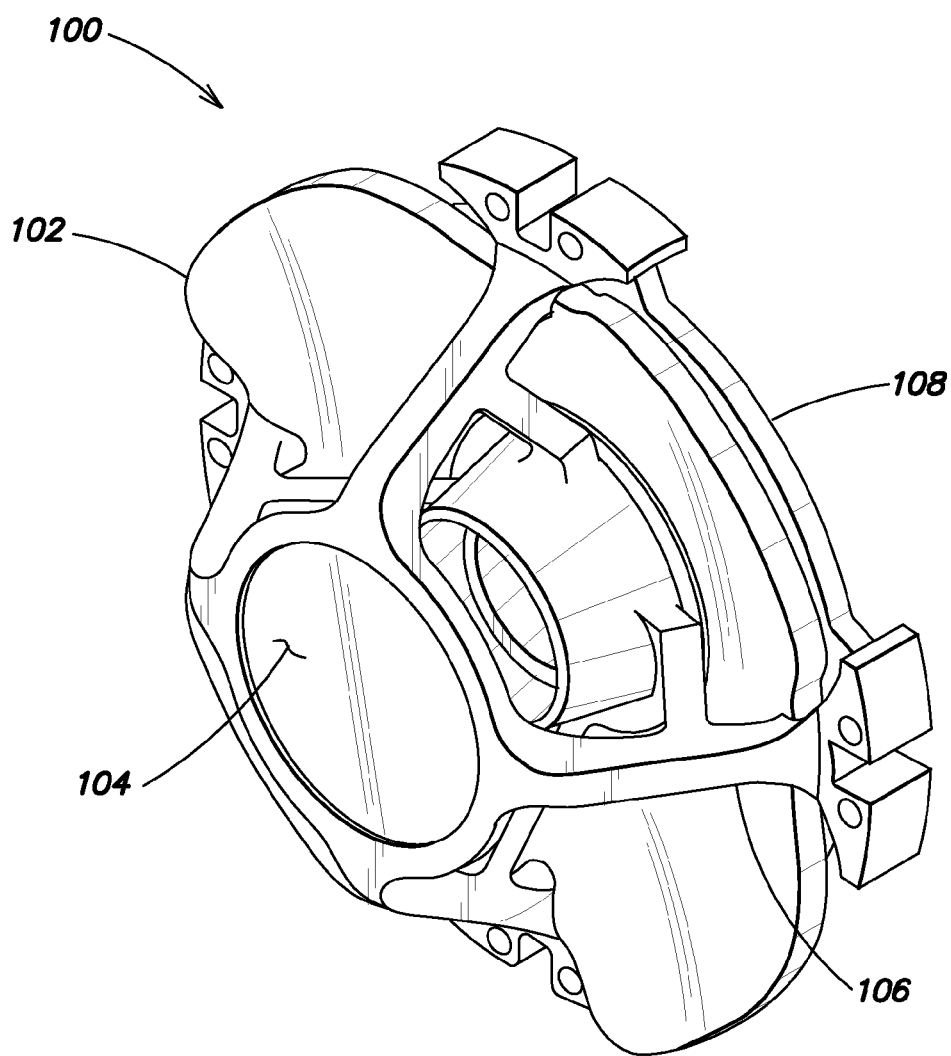
FIG. 1 is a trimetric front view of one example of an imaging optical apparatus according to aspects of the present invention.

Aspects and embodiments are directed to providing a low cost and low mass optical apparatus that can survive high acceleration while maintaining optical performance at varying temperatures.

According to certain embodiments, low cost and low mass are achieved by using inexpensive moldable polymer materials for the optics and for the structural components used in embodiments of the optical apparatus. In some embodiments, the optical apparatus is arranged in a cassegrain or catadioptric optics configuration.

According to certain aspects, quality of the optics and high G (acceleration) survival of the polymer optical apparatus are simultaneously achieved by segregating the optical and structural functions within embodiments of the optical apparatus. This segregation enables construction of a bi-polymer optical apparatus wherein each of the optics and the structural components are molded from different polymers. For example, in one embodiment, the minors are molded from unreinforced plastic such as unfilled Ultem® which is a fine optical substrate, but has low strength. Survival of the optical apparatus at high accelerations due to gun-launch is achieved by molding the structural components of the optical apparatus from a reinforced plastic such as carbon-fiber filled Ultem®. Therefore, this embodiment allows the molded unfilled optics to have adequate minor surface finish while structural components have adequate strength. According to another aspect, a low strength unreinforced plastic mirror survives gun-launch accelerations due to structural support provided to the outer portion of the minor during large deformations on gun-launch. The structural support is provided by a retainer disposed behind the mirror, as discussed further below.

Other aspects are directed to addressing the problem of optical distortion at varying temperatures due to the difference in coefficients of thermal expansion (CTE) of multiple materials used in the optical apparatus, as well as due to the difference in CTE between the materials used in the optical apparatus and the material of an external platform to which the optical system mounts. According to one aspect, optical performance is maintained despite temperature fluctuations by using low strength athermal bond joints to connect the optics to the structural components, thereby accommodating the differential expansion of dissimilar plastics. The bond joints do not have to carry large structural loads due to retainers that pick up the loads during the large deflections of gun-launch. According to another aspect, distortion from mismatched CTE is reduced by specification of the re-enforcing fiber to polymer proportion. According to another aspect, compliant structural connections are used within the optical apparatus to limit distortion of optics caused by loads from mounting to an external platform, and from thermal expansion mismatch between the structural components of the optical apparatus and the external platform.

Additional aspects are directed to an assembly method for the optical apparatus. In one example, accurate mirror placement is achieved during the assembly process for the optical apparatus by orientating mounting surfaces such that mounting location accuracies can be produced in the molded part.

In one embodiment made according to aspects disclosed herein, the optical apparatus configuration includes an unfilled Ultem® primary minor and an unfilled Ultem® secondary mirror, a germanium field lens, a carbon fiber-filled Ultem® strut, and two carbon fiber-filled Ultem® retainers. The minor material choice allows molded-in low surface roughness for mirror plating, while the strut and retainer materials provide stiffness and strength. The strut contains mounting features for the two mirrors and the field lens, as well as primary and secondary baffle features, and interface mounts for connecting the optical apparatus to an external assembly or platform. The parts are bonded together using room temperature vulcanized (RTV) bonds for the optics and epoxy for the retainers. Joint locations and bond line widths reduce thermally induced distortion of the optics. The geometry of the strut structure allows tool access and control of the location of critical features needed in the assembly process.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. Referring to FIG. 1, there is illustrated one example of an optical apparatus 100 assembled according to aspects disclosed herein. In particular, FIG. 1 is a front trimetric view of the optical apparatus 100. The optical apparatus 100 includes a primary mirror 102 with a relatively large surface area to collect light, a secondary mirror 104, and a strut generally indicated at 106. The strut 106 mounts both minors such that the minors are optically coupled. The optical apparatus 100 further includes a retainer 108 disposed behind the primary minor 102. The retainer 108 is configured to structurally support the optical apparatus 100 and to limit axial deflections (along the optical axis) of the primary minor 102 during high acceleration, as discussed further below.

Figure 2:
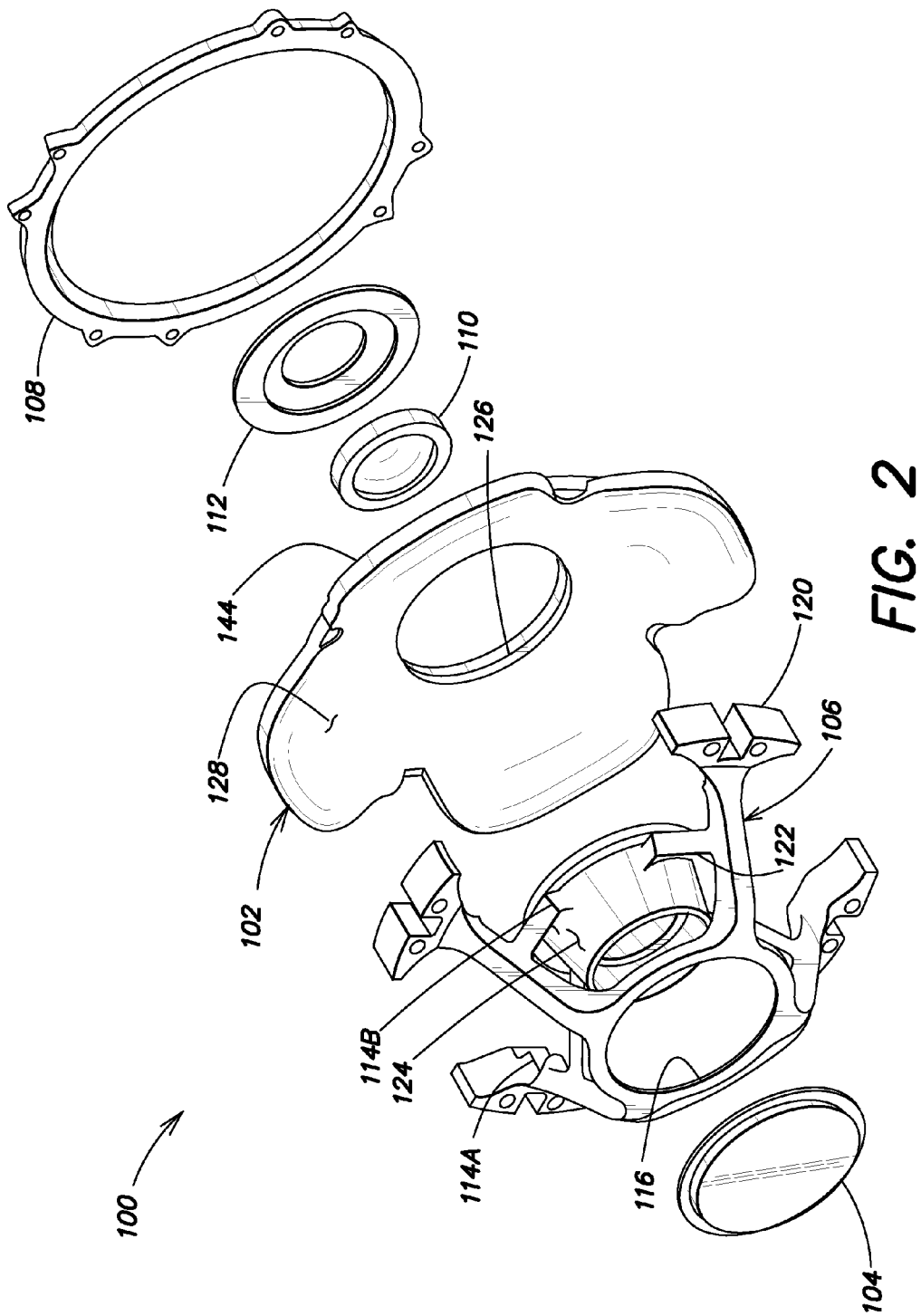
FIG. 2 is an exploded trimetric front view of one example of an imaging optical apparatus according to aspects of the present invention.

FIG. 2 is an exploded view of the optical apparatus 100 of FIG. 1. As shown, the optical apparatus 100 includes the primary minor 102, secondary mirror 104, strut 106, a field lens 110, the outer retainer 108 and an inner retainer 112. The mirror materials may be chosen for their ability to mold-in low surface roughness for mirror plating, while the strut and retainer materials may be chosen for their stiffness and strength. In one example, the primary mirror 102 and the secondary mirror 104 are made of unfilled polyetherimide material (Ultem®), the field lens 110 is made of germanium, the strut 106 is made of carbon fiber-filled Ultem®, and the outer retainer 108 and the inner retainer 112 are made of carbon-fiber filled Ultem®. The strut may generally include a plurality of cross-struts. In FIG. 2, the strut is shown to include four cross-struts 122. However, the number of cross-struts may vary and is not limited to four. The strut 106 contains mounting features for the mirrors 102 and 104 and the field lens 110. The primary mirror 102 includes an inner edge 126 to accommodate the field lens 110. The primary mirror 102 further includes a plurality of outer lobes 128 configured to increase the collecting area. The outer lobes 128 of the primary mirror 102 define an outer edge 144 of the primary mirror. In FIG. 2, the mounting features for the primary minor 102 are indicated at 114A and 114B. Mounting features 114A accommodate the primary mirror 102 while isolating the outer lobes 128 of the primary mirror from the strut 106. The mounting features 114B connect to the inner edge 126 of the primary mirror. Mounting features 116 accommodate the secondary mirror 104. Mounting features 118 (shown in FIG. 3) accommodate the field lens 110.

Still referring to FIG. 2, the strut 106 further includes interface mounts 120 to connect the optical apparatus 100 to an external platform or assembly (not shown in FIG. 2). In some embodiments, the strut 106 may include a primary baffle 124 disposed between the field lens 110 and the secondary minor 104 and configured to block stray light. In other embodiments, the strut 106 may include additional features not illustrated in FIG. 2. For example, the strut 106 may include a plurality of secondary baffle features located adjacent to the secondary mirror 104 and configured to further block stray light. In FIG. 2, the inner retainer 112 is disposed behind the field lens 110 and the primary minor 102 and the outer retainer 108 is disposed behind the primary minor. The retainers are configured to provide structural support and to limit deflections during high G operation.

Figure 3:
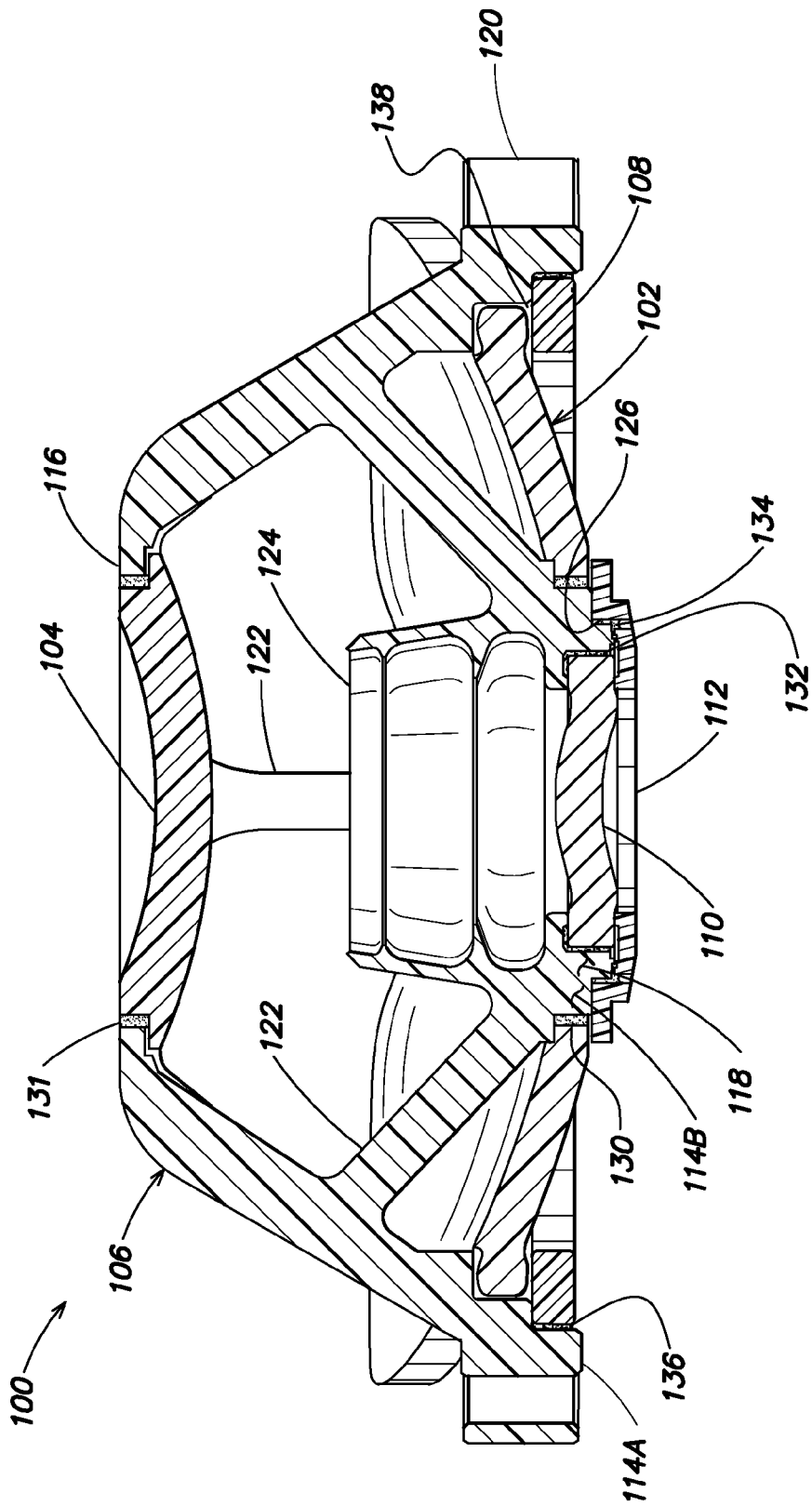
FIG. 3 is a cross sectional view of one example of an imaging optical apparatus, illustrating room temperature vulcanized bonds between the optics and the strut, and structural adhesive bonds between the retainers and the strut, according to aspects of the present invention.

FIG. 3 is a cross-sectional view of the apparatus of FIG. 1, illustrating one example of bond lines that may be used to connect the parts of the apparatus. Room temperature vulcanized (RTV) bonds are used to bond the optics to the strut 106. In the example illustrated in FIG. 3, RTV bonds 130 connect the inner edge 126 of the primary minor 102 to the mounting features 114B of the strut 106. The mounting features 114A of the strut 106 retain the primary minor 102. RTV bonds 131 connect the outer edge of the secondary mirror 104 to the mounting features 116 of the strut 106. RTV bonds 132 connect the field lens 110 to the mounting features 118 of the strut 106. In the example shown in FIG. 3, the mounting features 114B and the mounting features 118 of the strut 106 are located adjacent to each other, and mount the field lens 110 and the primary minor 102 in a concentric configuration. Structural bonds are used to connect each of the inner retainer 112 and outer retainer 108 to the strut 106. For example, epoxy bonds 134 connect the inner retainer 112 to the strut 106. Epoxy bonds 136 connect the outer retainer 108 to the strut 106.

According to another aspect, optical distortion due to mismatched materials within an IR imaging optical apparatus is addressed by using RTV bonds to connect parts having mismatched materials. For example, in one embodiment, the primary minor 102 is formed from a substantially uniform thickness substrate of unfilled Ultem®. The strut 106 is formed from a carbon fiber-filled Ultem® material. The primary mirror 102 is then bonded at its inner edge (diameter) 126 to the carbon fiber-filled Ultem® strut 106 using RTV bonds 130 (FIG. 3). Referring to FIG. 3, the higher coefficient of thermal expansion (CTE) of the primary minor 102 versus the strut 106 allows the RTV bond gap between the inner edge 126 of the primary mirror and the adjacent mounting feature 114B of the strut to be sized such that the CTE of the adhesive compensates for the differential expansion of the two parts, thereby athermalizing the interface and eliminating thermal distortion stresses. The CTE of the RTV bonds 130 and the size of the RTV bond gaps accommodate the differential expansion of the primary mirror 102 and the strut 106 and athermalize the interface between the inner edge 126 of the primary minor and the mounting features 114B of the strut. The same holds true for the field lens 110 in FIG. 3, which is made of germanium, as the CTE of germanium is lower than the surrounding carbon fiber-filled Ultem® strut 106. Athermalization of the secondary minor 104 does not follow these typical guidelines, as the higher CTE mirror material is surrounded by the lower CTE strut 106. However, the flexibility of the strut 106 and the relatively small size of the secondary minor 104 allow joints to flex, keeping distortion low.

Bond lines may be mechanisms for rejecting high acceleration launch shocks. In one example, due to the aft installation of the optics into the strut, the bond lines are the primary mechanism for rejecting set-back launch shock. Structural analyses of the apparatus without retainers reveal bond line failures for the primary mirror and the field lens, as well as a high degree of bending stress in the primary mirror from outer lobe flexing. Therefore, retainers may be incorporated into the apparatus to minimize deflection and increase the overall stiffness.

Figure 4:
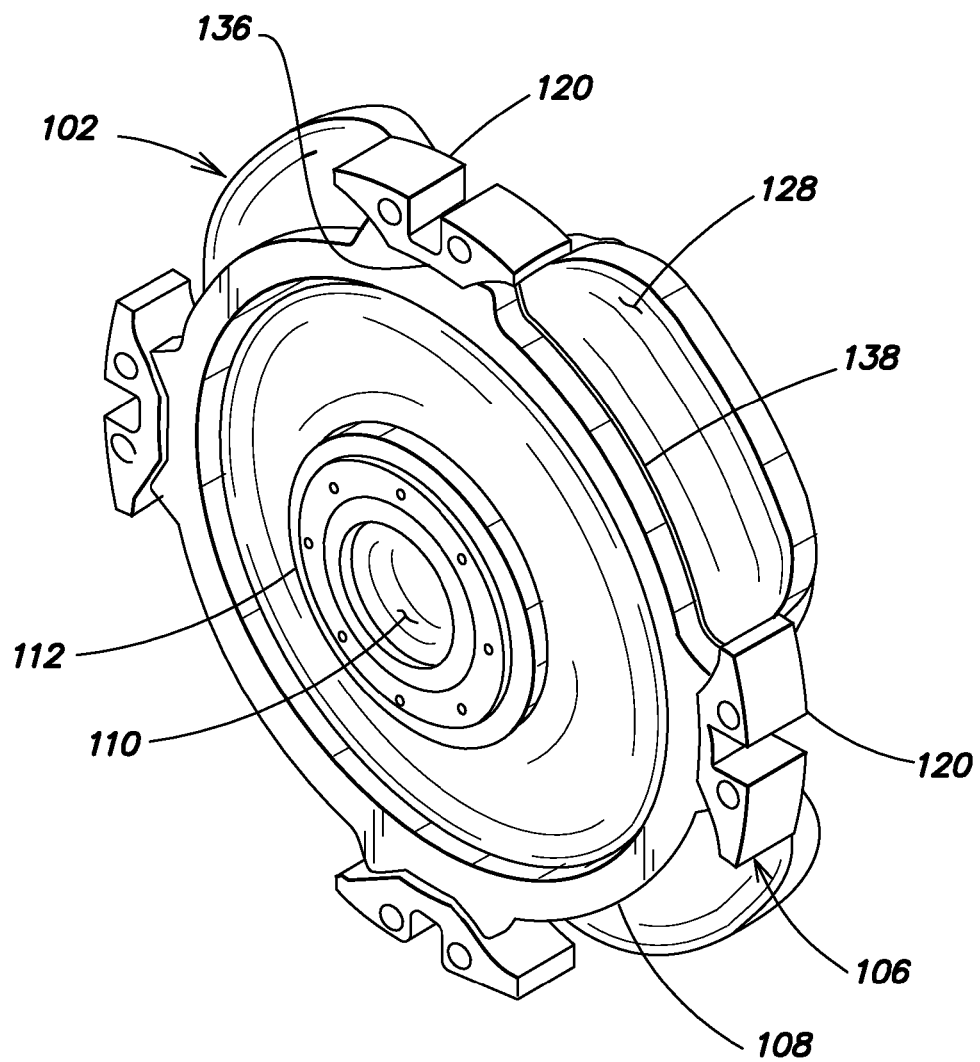
FIG. 4 is a trimetric view of the aft portion of one example of an imaging optical apparatus according to aspects of the present invention.

FIG. 4 is the aft side of the apparatus of FIG. 1, illustrating the outer retainer 108 and inner retainer 112 disposed behind the primary mirror 102 and the field lens 110 respectively, and further illustrating an aft view of the interface mounts 120 on the strut 106. As discussed above, the retainers may be bonded to the strut using structural adhesive, such as epoxy bonds, for example. In the embodiment shown in FIG. 4, the outer retainer 108 bonds to the strut 106 in four bond areas 136 near the four strut interface mounts 120. In the illustrated example, the inner retainer 112 also bonds to the strut 106, but in a continuous ring, rather than four discrete locations. Similar to the outer retainer 108, the inner retainer 112 acts as a deflection stop for the field lens 110 and primary mirror 102, helping limit the amount of shear stress generated in the RTV bond lines. In one example, each retainer maintains a nominal 0.01 inch gap between it and the aft side of the primary mirror 102. The gap may be configured such that the retainers and the primary mirror do not contact under thermal expansion or contraction, yet the retainers limit set-back deflection to a reasonably small amount. The gap 138 between the outer retainer 108 and the primary mirror 102 is shown in FIG. 3 and FIG. 4. In one example, the inner retainer 112 directly contacts the aft surface of the field lens 110, as shown in FIG. 3. This results in minimal movement of a relatively heavy lens as well as lowers its internal stresses. While the field lens and the inner retainer may have different CTE, the contact may have minimal impact on the thermal distortion of the lens due to the thin cross-section of the retainer, and its intrinsic flexibility.

Figure 5:
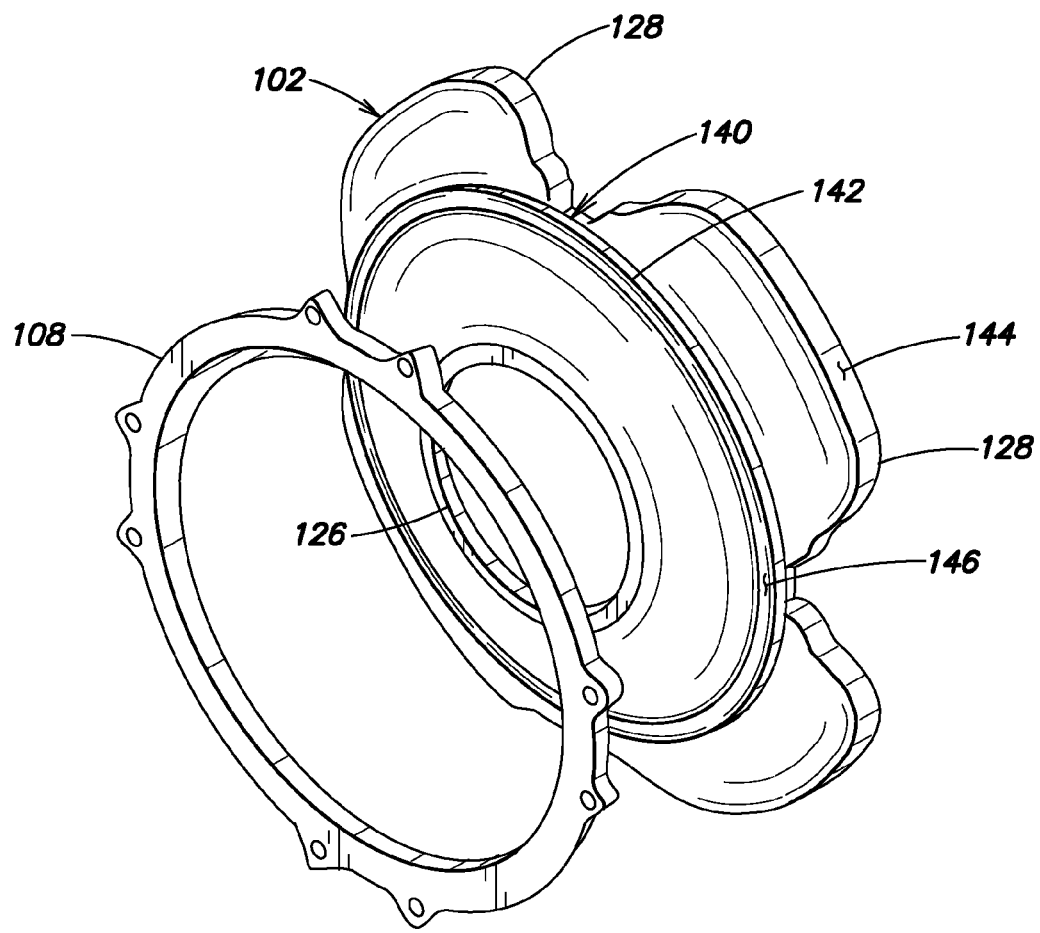
FIG. 5 is an exploded trimetric view of the aft portion of one example of an imaging optical apparatus, illustrating a protrusion formed on the primary mirror and an outer retainer to be disposed behind the primary minor, according to aspects of the present invention.

FIG. 5 is an exploded aft view of the primary mirror 102 and the outer retainer 108 of the embodiment in FIG. 1. In one embodiment, the primary mirror may be molded to include a protrusion that limits deflection of the primary mirror. For example, a protrusion 140 may be formed on the aft side of the primary mirror 102, as shown in FIG. 5. The protrusion may have a thickness that forms an outer edge of the primary mirror. The protrusion may further define an aft surface (on the aft side of the mirror) or a set-back stop feature which may be used in conjunction with an aft retainer to limit set-back axial deflection of the primary mirror. The protrusion may further define a front surface or a set-forward stop feature which may be used in conjunction with a strut stop feature to limit set-forward deflection of the primary mirror (as discussed below). For example, referring to FIG. 5, a rounded ring-shaped protrusion 140 is formed on the aft side of the primary mirror 102, the protrusion being located radially inward from the outer lobes 128 of the primary mirror, such as between the inner edge 126 of the primary mirror and the outer lobes. The protrusion 140 further defines an outer edge 142 of the primary mirror 102 that is different from the outer edge 144 defined by the primary mirror lobes 128. The protrusion 140 further forms a set-back stop feature 146 which is used in conjunction with the outer retainer 108 to limit set-back axial deflection of the primary mirror 102. The outer retainer ring 108 provides continuous axial support for the protrusion 140 on the aft surface of the primary mirror 102. In one example, a 0.01 inch nominal gap is formed between the outer retainer 108 and the primary mirror 102 to ensure that they do not contact under thermal expansion or contraction, yet limit set-back deflection of the primary mirror to a reasonably small amount.

Figure 6:
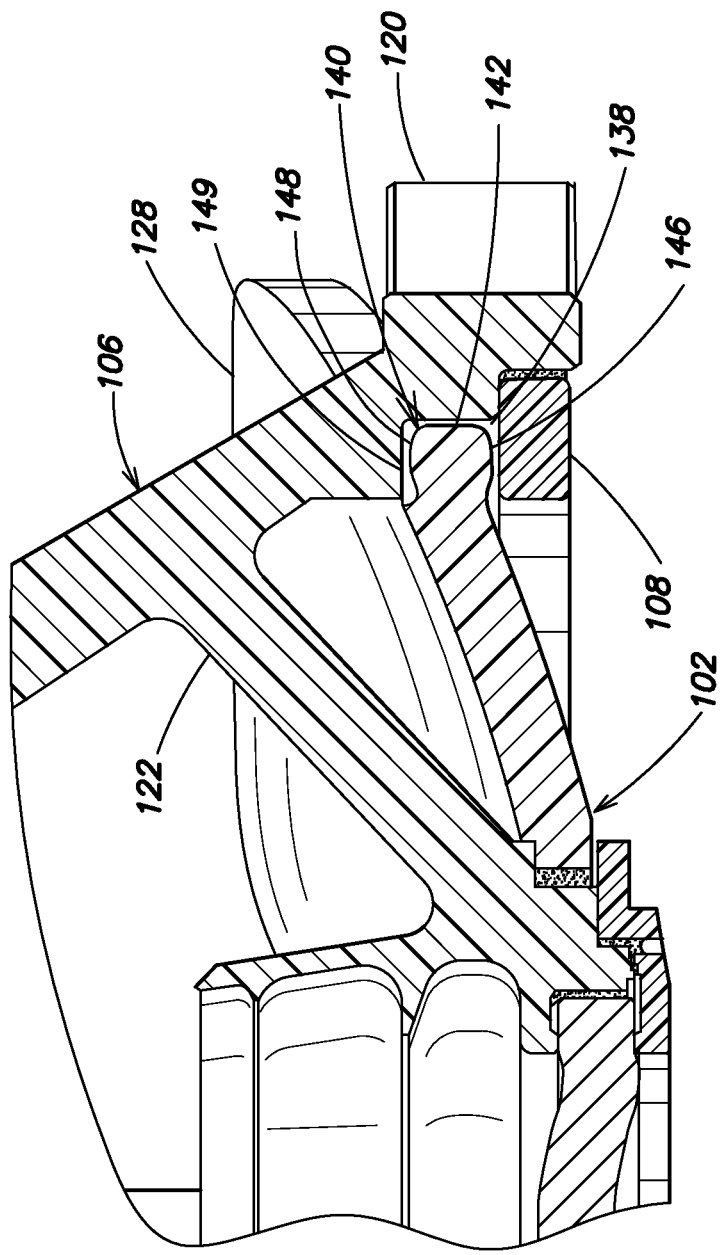
FIG. 6 is a cross sectional view of a portion of one example of an imaging optical apparatus, illustrating stop features that limit deflections of the primary mirror, according to aspects of the present invention.

FIG. 6 is a cross sectional view of the apparatus of FIG. 1, further illustrating stop features that limit deflection of the primary mirror. The primary mirror 102 is shown to have a protrusion 140. The protrusion 140 has an outer edge 142. The protrusion 140 further defines a set-back stop feature 146 that together with the outer retainer 108 is used to limit set-back deflection of the primary mirror 102. The protrusion 140 further defines a set-forward stop feature 148 that acts together with a stop feature 149 molded into the strut 106 to limit set-forward load deflection of the primary mirror 102 and the outer primary lobes 128. In one example, stop features 149 are molded into the strut 106 adjacent to each of the four cross-struts 122 and offset from the primary mirror 102 by a 0.01 inch nominal gap. The primary mirror 102 thus floats axially between the strut stop features 149 and the outer retainer 108.

Set-back and set-forward finite element analyses for a ⅛ symmetry model of the apparatus of FIG. 6 revealed maximum stress points in the strut. In one analysis, the set-forward load case is a steady state 10,000 G (322,000 ft/s$^2$) longitudinal acceleration in the direction from the primary mirror 102 towards the secondary mirror 104. In another analysis, the set-back load case is a steady state 2,500 G (80,400 ft/s$^2$) longitudinal acceleration in the direction from the secondary mirror 104 towards the primary mirror 102. The maximum stress points for both analyses occur in the strut, with the set-back load inducing 17.8 ksi (thousand pounds per square inch) of stress (carbon fiber-filled Ultem® has a tensile strength of approximately 23.3 ksi). In these simulations, both mirrors exhibit a maximum of approximately 6 ksi of stress regardless of load direction (unfilled Ultem® has a tensile strength of approximately 16 ksi). Thus, these analyses demonstrate that the strut may absorb applied stress, such that the mirrors are not subjected to high stress.

Figure 7:
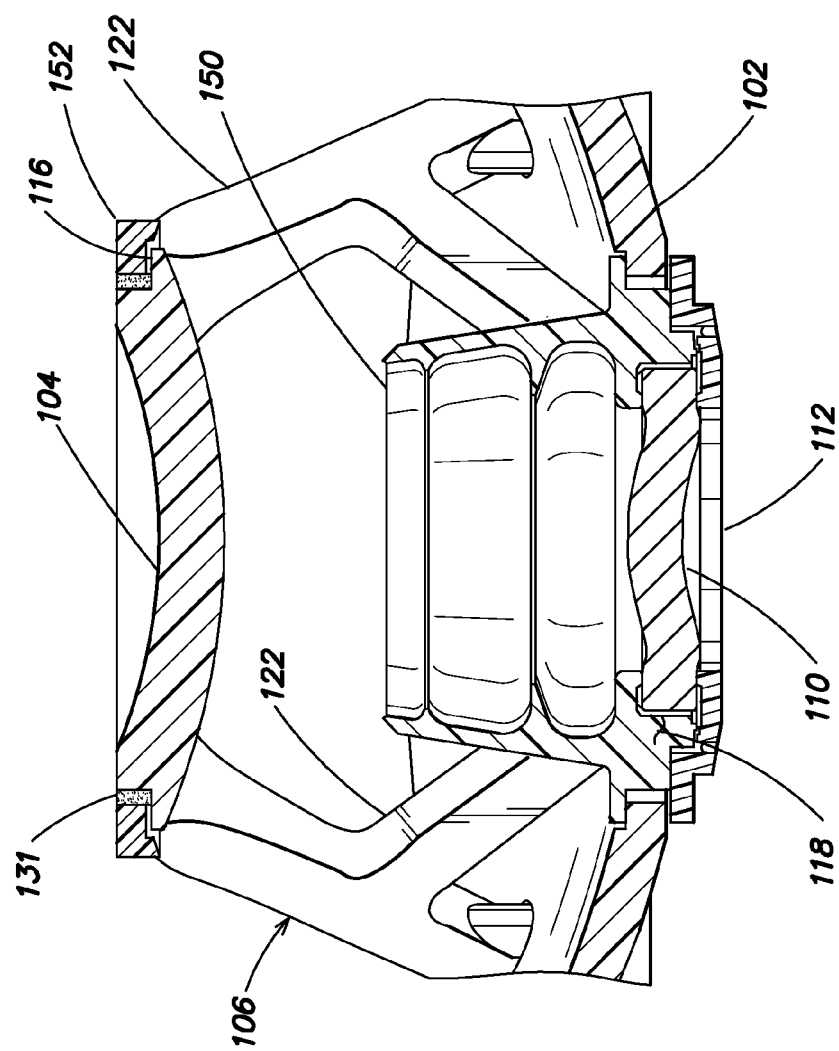
FIG. 7 is a cross-sectional view of a portion of one example of an imaging optical apparatus, illustrating primary and secondary baffle features, according to aspects of the present invention.

Other aspects are directed to addressing the issue of stray light that may impact optical performance. In some embodiments, the strut 106 may be molded (or otherwise constructed) to include baffle features to block stray light. FIG. 7 shows one example of an embodiment including primary baffle features 150 and secondary baffle features 152. The primary baffle features 150, which may further include internal features, are disposed adjacent to the field lens mounting features 118 of the strut 106 and extend in the direction towards the secondary mirror 104. The strut 106 may further include secondary baffle features 152 disposed between the secondary mirror 104 and the strut mounting features 116 for the secondary mirror. In one embodiment, the strut 106 is molded from a carbon fiber-filled Ultem® material that is dark gray and therefore has low reflectivity, and also has an elevated level of intrinsic surface roughness, thereby blocking stray light. Such and other enhancements that can be made during the molding process may add additional stray-light blocking performance.

Figure 8:
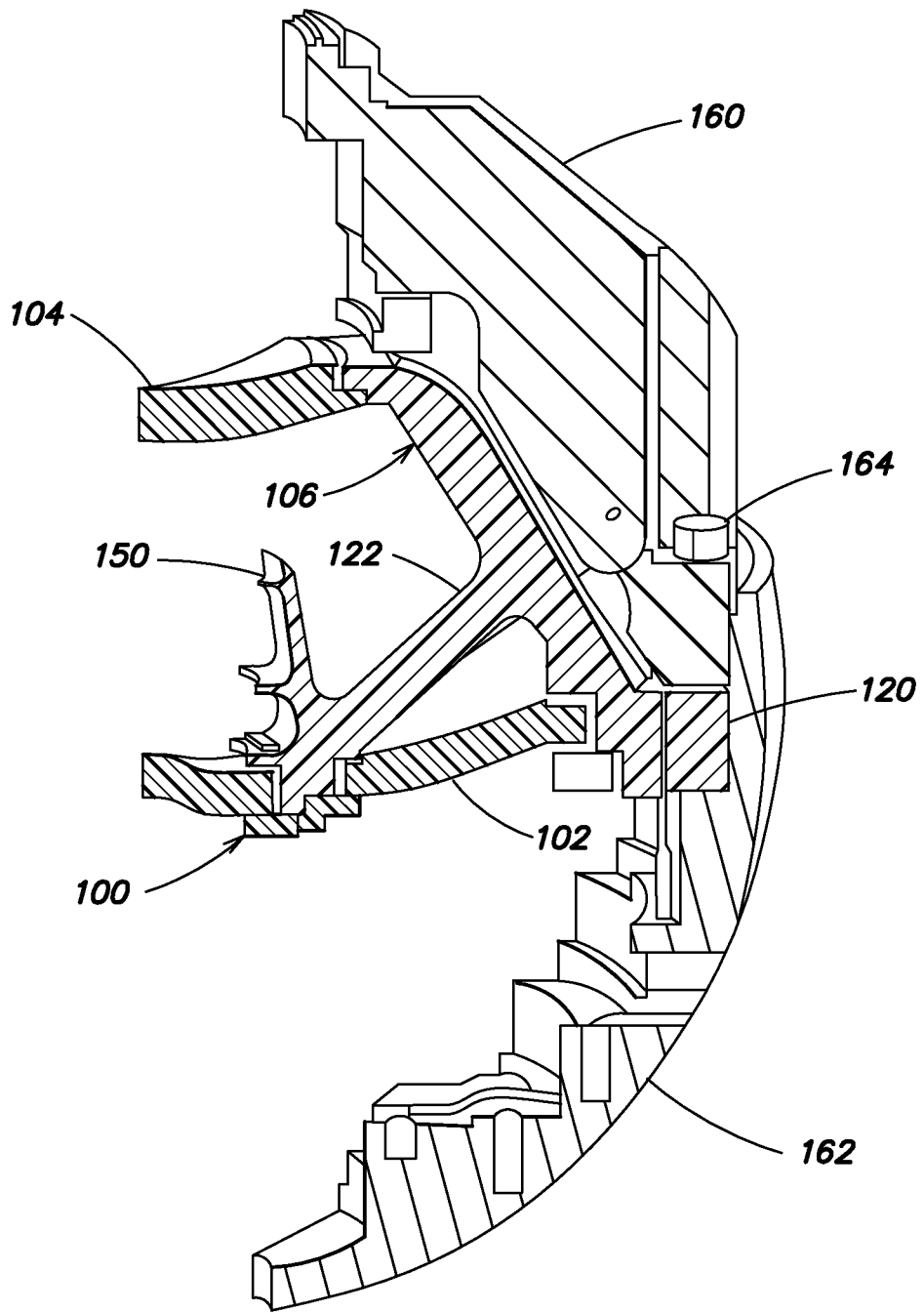
FIG. 8 is a trimetric cross sectional view of a portion of one example of an imaging optical apparatus mounted to external platforms via the strut interface mounts, according to aspects of the present invention.

FIG. 8 illustrates one example of a portion of an optical system including the optical apparatus 100 connected to an external assembly 160 and additionally mounted on an external gimbal platform 162. The strut 106 of the optical apparatus includes interface mounts 120 used to connect the apparatus 100 to the external assembly 160 and the gimbal ball platform 162. According to one aspect, the problem of optical distortion due to mismatch between the material of the primary mirror 102 and the material of an external platform 162 to which the optical apparatus 100 mounts is addressed by isolating the primary mirror surface from the mechanical structures and external platform. According to another aspect, optical distortions caused by external mounting are minimized due to the isolation of the optics from the interface mounts located on the strut 106. For example, referring to FIG. 8, the primary mirror 102 may be mounted such that it does not contact the interface mounts 120 used to fasten the apparatus 100 to an external platform 162, but rather floats in between axial deflection stop features as shown and discussed above with reference to FIG. 6. The secondary mirror isolation may be achieved using the flexibility of the strut 106 and relatively long length of the cross-struts 122 to attenuate stresses. In one embodiment, due to the isolation of the optics, standard steel fasteners 164 are used to mount the apparatus 100 to the external gimbal ball 162, as shown in FIG. 8. In one embodiment, mounting stresses are also athermal, the strut 106 material of the optical apparatus 100 being the same as the strut material of the external assembly 160 connected to the optical apparatus, and the CTE of the strut of the optical apparatus further being very close to that of the external gimbal ball 162 to which the apparatus is mounted. In one example, the external gimbal ball is made of aluminum.

Embodiments may include a one-piece strut design which allows for better moldability and achieving the as-molded axial tolerances necessary to focus the system. As discussed above, the one-piece strut may include a plurality of cross-struts 122. The number and configuration of the cross-struts in the optical apparatus may be adjusted according to analyses conducted to assess the performance impact of the cross-struts. In some embodiments, the size of the cross-struts or the size of other strut features may be reduced to trade structural stiffness and strength performance with enhanced optical performance.

Figure 9:
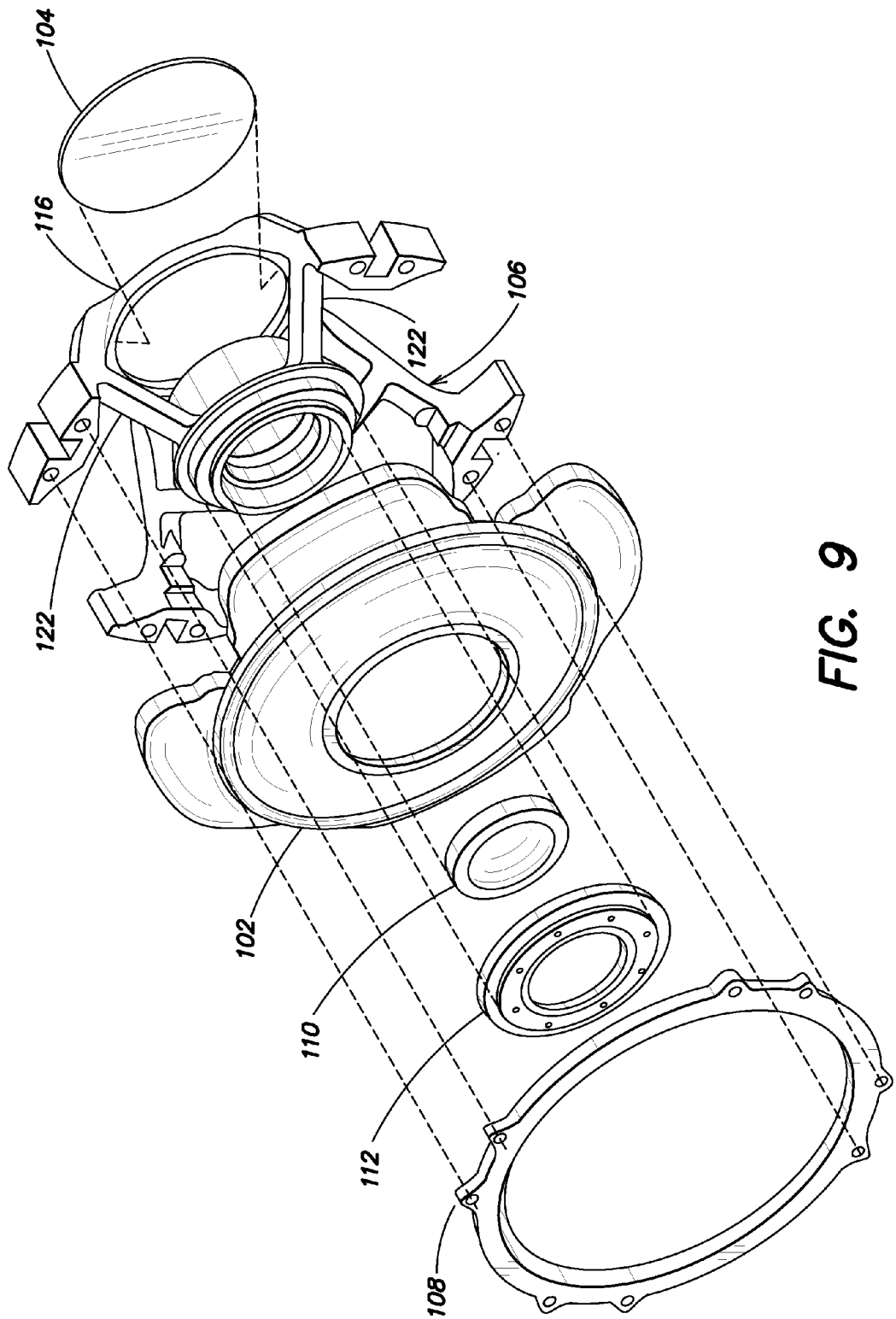
FIG. 9 is an exploded trimetric aft view of one example of an imaging optical apparatus, illustrating its assembly lines, according to aspects of the present invention.
Figure 10:
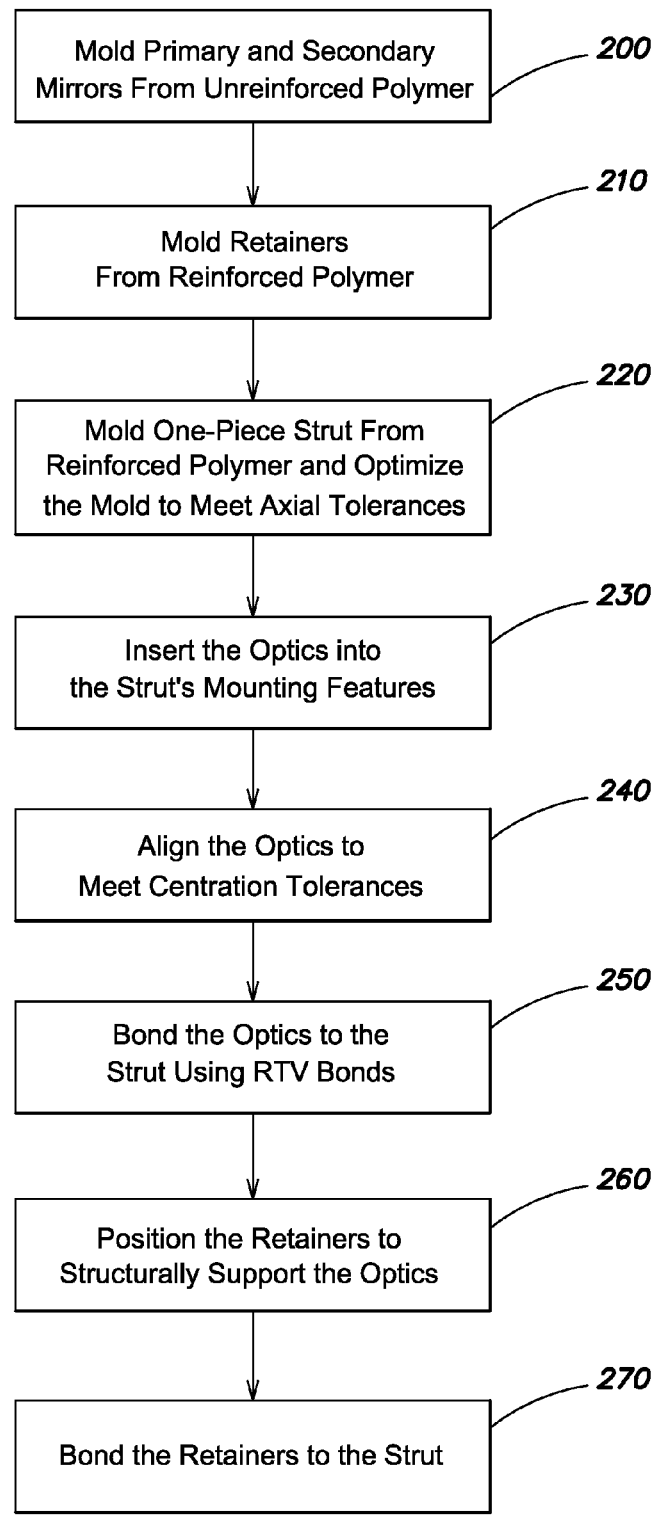
FIG. 10 is a flow chart of one example of an assembly method for an imaging optical apparatus, according to aspects of the present invention.

Other aspects address the assembly method for the optical apparatus. FIG. 9 illustrates one example of an assembly method via assembly lines superimposed on an exploded view of an optical apparatus 100 being assembled. FIG. 10 is a flow chart of one example of an assembly method. The following description refers to FIG. 9 and FIG. 10. In one embodiment, the assembly method may include molding the optics and the structural parts of the optical apparatus. In another embodiment, the molding may be considered as input to the assembly method. The components may also be constructed by processes other than molding. In one example, the assembly method includes molding the primary minor 102 and the secondary mirror 104 from unreinforced polymer (step 200 in FIG. 10). The outer retainer 108 and the inner retainer 112 may be molded from a reinforced polymer (step 210). A one-piece strut 106 is also molded from the reinforced polymer (step 220). The one-piece strut design allows for all mounting datums to be located on a common part, reducing tolerance stack-ups. To ensure moldability, in one embodiment the axial mounting surfaces for the strut itself, the primary minor and the field lens are all aft-oriented while the secondary mirror datum is forward-oriented. This allows the strut to be formed by two mold halves that are pulled away from each other in the axial direction. According to one aspect of the assembly process, the molds are optimized to meet the axial tolerances for the optical chain (step 220). This leaves meeting only centration tolerances during later stages of the assembly process (step 240). In one embodiment, step 240 may further include a combination of shim-to-center and active alignment fixturing techniques to achieve the necessary level of precision. In other embodiments, the strut may be made from two pieces or a plurality of pieces, and as a result, the assembly method may include additional alignment steps. In one embodiment, the strut is molded from a carbon fiber-filled Ultem® material wherein the mold is enhanced to add stray-light blocking performance, as discussed above.

Figure 11:
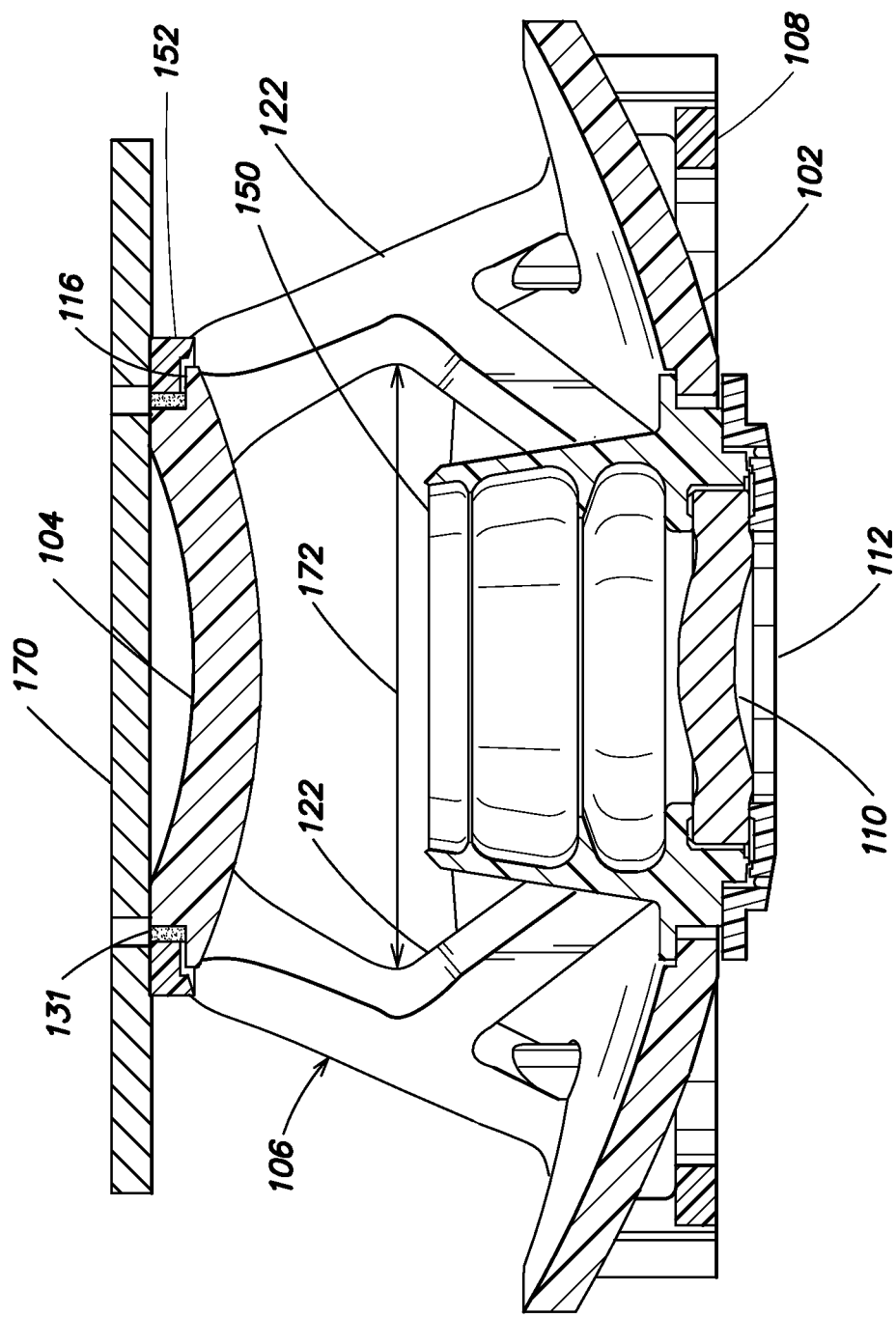
FIG. 11 is a cross-sectional view of one example of an imaging optical apparatus, illustrating secondary minor mounting, according to aspects of the present invention.

Still referring to FIG. 9 and FIG. 10, the assembly method further includes inserting the optics into the mounting features of the strut (step 230). In one embodiment, before the primary mirror 102 and field lens 110 are mounted onto the aft flats of the strut 106, the secondary mirror 104 is inserted radially through a gap between adjacent cross-struts 122 and placed into position within the strut bond ring of the secondary minor mounting feature 116. FIG. 11 illustrates one example of a secondary minor mounting method. The secondary minor 104 is inserted through the secondary insertion gap 172 and placed within the secondary mirror mounting feature 116 of the strut 106. The axial position of the secondary minor 104 may be controlled through the use of an axial reference flat assembly aid 170 that co-locates the forward face of the secondary mirror to the forward face of the strut 106. Access holes and mounting features may be present on the assembly aid for incremental movement of the secondary mirror as well as initial tack-bonding.

There may be moldability constraints on the clear aperture (CA) of the secondary mirror 104 (for example 1 mm edge-to-CA border). To ensure the CA and the standard mold constraints are met, the outer diameter (OD) of the secondary minor 104 may be increased, introducing a tradeoff with respect to the secondary baffles 152. Furthermore, there may be geometrical constraints on the OD of the secondary minor 104 for installation. For example, in one embodiment, the secondary baffles 152 are removed and the secondary mirror 104 includes flats molded or post-machined into opposite sides of its outer diameter to ensure that it will fit in between adjacent cross-struts 122 for assembly. In one embodiment, the optical apparatus configuration includes a secondary minor wherein the minor OD is only slightly larger than the CA and a secondary baffle is present. In one example, the mirror has roughly 0.02 inches of clearance between the cross-struts for installation. Altering cross-strut angles to increase secondary mirror clearance may affect the structural integrity of the optical apparatus. In one embodiment, the cross-strut angles are configured to increase clearance without adversely affecting the structural integrity of the apparatus. In one embodiment, reductions in the moldability constraints and partitioning part of the secondary baffle to the primary baffle provides the spatial margin needed to keep the secondary baffle as well as maintain the geometrical constraints required to assemble the secondary minor.

Referring again to FIG. 9 and FIG. 10, after the optics are aligned (step 240) and bonded into the strut using RTV bonds (step 250), two aft retainers 108 and 112 are positioned at the aft side of the strut 106 (see assembly lines for the retainers 108 and 112 in FIG. 9) to help limit the set-back displacement of the primary minor 102 and field lens 110 (step 260). In one embodiment, epoxy compound is used to bond the retainers 108 and 112 to the strut 106 (step 270). In other embodiments, ultrasonic or chemical weld processes are used to attach the retainers to the strut 106. A weld process may be advantageous for high rate production, as bond curing and preparation may be eliminated. In one embodiment, a retainer for the secondary mirror 104 may not be necessary due to the small mass and relatively large bond area of the secondary mirror.

Aspects and embodiments are directed to systems and assembly methods for a bi-polymer infrared optics configuration to compensate for the inability to mold reflective optics from filled Ultem® materials. While molding samples have demonstrated the inability to use filled Ultem® materials as minor substrates, certain embodiments disclosed herein do not rely on these materials for optical components, but rather utilize them only in a structural capacity. In one embodiment, the optical system utilizes a one-piece strut design, molded from carbon fiber-filled Ultem®, to house the unfilled Ultem® minors and germanium field lens. The optical components are bonded to the strut using RTV bonds, while epoxy is used to bond two carbon fiber-filled Ultem® retainers to the strut. Preliminary structural analysis has indicated that the system is capable of surviving launch shock with adequate margin to both the structural components as well as the bond lines. The design also shows promise as a low-distortion system capable of segregating differential CTE-induced stresses and external mounting-induced stresses from the optical train.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging optical apparatus comprising:
   a primary mirror made of an unreinforced polymer;
   a secondary minor made of the unreinforced polymer and optically coupled to the primary minor;
   a field lens optically coupled to the secondary mirror;
   a strut having a plurality of cross-struts and mounting features configured to mount the primary mirror, the secondary mirror and the field lens;
   an outer retainer disposed behind the primary mirror and coupled to the strut; and
   an inner retainer disposed behind the field lens and coupled to the strut, the outer and inner retainers configured to structurally support the primary minor and the field lens and to accommodate deflections of the primary mirror.

2. The imaging optical apparatus in claim 1, wherein the strut, the outer retainer and the inner retainer are made of a reinforced polymer.

3. The imaging optical apparatus in claim 2, wherein the unreinforced polymer is unfilled polyetherimide plastic and the reinforced polymer is carbon-fiber filled polyetherimide plastic.

4. The imaging optical apparatus in claim 3, wherein the field lens is made of germanium.

5. The imaging optical apparatus in claim 2, wherein each of the primary mirror, the secondary mirror and the field lens is bonded to the strut using room temperature vulcanized (RTV) bonds and each of the outer retainer and the inner retainer is bonded to the strut with structural adhesive bonds.

6. The imaging optical apparatus in claim 5, wherein the primary minor includes a plurality of outer lobes configured to increase a collecting area of the primary mirror, each of the plurality of outer lobes being isolated from the strut, and wherein the primary mirror further includes an inner edge within the primary mirror, the primary minor being bonded to the strut at the inner edge.

7. The imaging optical apparatus in claim 6, further comprising a plurality of mechanical stop features formed on each of the strut and the primary minor to limit deflections of the primary minor, the plurality of stop features of the primary mirror being disposed between the plurality of stop features of the strut and the outer retainer.

8. The imaging optical apparatus in claim 7, wherein each of the plurality of stop features of the primary minor further includes:
   a set-forward stop feature to limit forward axial deflection; and
   a set-back stop feature to limit backward axial deflection.

9. The imaging optical apparatus in claim 8, wherein the primary mirror is disposed relative to the strut and the outer retainer to form:
   a plurality of forward gaps between the plurality of set-forward stop features of the primary minor and the plurality of stop features of the strut; and
   a plurality of backward gaps between the plurality of set-back stop features of the primary mirror and the outer retainer.

10. The imaging optical apparatus in claim 9, wherein the primary mirror includes a protrusion formed at a radius between the inner edge and the plurality of outer lobes of the primary minor, the protrusion being configured to form the plurality of stop features of the primary minor to limit deflections of the outer lobes.

11. The imaging optical apparatus in claim 5, wherein the primary mirror has a first coefficient of thermal expansion (CTE), the strut has a second CTE, the field lens has a third CTE, the first CTE being higher than the second CTE and the second CTE being higher than the third CTE, and wherein:
   the primary minor includes an inner edge within the primary mirror, the primary minor being bonded to the strut at the inner edge;
   the RTV bonds between the inner edge of the primary minor and the strut are configured to athermalize the interface between the inner edge of the primary minor and the strut; and
   the RTV bonds between the field lens and the strut are configured to athermalize the interface between the field lens and the strut.

12. The imaging optical apparatus in claim 2, wherein a reinforcing material to polymer proportion of the reinforced polymer is selected to reduce mismatch between a coefficient of thermal expansion (CTE) of the reinforced polymer and a CTE of the unreinforced polymer.

13. The imaging optical apparatus in claim 1, the strut including:
   at least one primary baffle feature disposed between the field lens and the secondary mirror and configured to block stray light.

14. The imaging optical apparatus in claim 13, the strut mounting features including a mounting feature for the secondary mirror, the strut further comprising:
   at least one secondary baffle feature disposed between the secondary mirror and the mounting feature for the secondary mirror and configured to block stray light.

15. The imaging optical apparatus in claim 1, the strut including:
   at least one interface mount to attach the imaging optical apparatus to an external platform, the at least one interface mount being disposed such that the primary minor is isolated from the external platform.

16. An imaging optical apparatus comprising:
   a primary mirror made of an unreinforced polymer;
   a secondary minor made of the unreinforced polymer and optically coupled to the primary minor;
   a field lens optically coupled to the secondary mirror;
   a strut made of a reinforced polymer and having a plurality of cross-struts and mounting features configured to mount the primary minor, the secondary mirror and the field lens.

* * * * *

UNITED STATES PATENT AND TRADEMARK OFFICE
CERTIFICATE OF CORRECTION

Page 1 of 5

PATENT NO.        : 8,567,969 B2
APPLICATION NO.   : 13/370543
DATED             : October 29, 2013
INVENTOR(S)       : John A. Thomas et al.

It is certified that error appears in the above-identified patent and that said Letters Patent is hereby corrected as shown below:

On the Title Page, Item (57), In the Abstract, "minor" should be --mirror-- throughout, as follows:

Optical systems configured to withstand operation in high acceleration and verifying temperature environments, and methods assembling the same. In one example, an imaging optical apparatus includes a primary mirror made of an unreinforced polymer, a secondary mirror made of unreinforced polymer, and optically coupled to the primary mirror, a field lens optically coupled to the secondary mirror, and a strut having a plurality of cross-struts and mounting features configured to mount the primary mirror, the secondary mirror and the field lens. In some examples, the imaging optical apparatus further includes an outer retainer disposed behind the primary mirror and coupled strut, and an inner retainer disposed behind the field lens and coupled strut, the outer and inner retainers configured to structurally support the primary mirror and the field lens and to accommodate deflections to the primary mirror.

In the Specification:

In column 1, line 17, "minors" should be --mirrors--.
In column 1, line 29, "minor" should be --mirror--.
In column 1, line 56, "minor" should be --mirror--.
In column 2, line 25, "minor" should be --mirror--.
In column 2, line 26, "minor" should be --mirror--.
In column 2, line 30, "minor" should be --mirror--.
In column 2, line 37, "minor" should be --mirror--.
In column 2, line 49, "minor" should be --mirror--.
In column 2, line 56, "minor" should be --mirror--.

Signed and Sealed this
Thirteenth Day of May, 2014

Michelle K. Lee
*Deputy Director of the United States Patent and Trademark Office*

In column 2, line 61, "minor" should be --mirror--.
In column 2, line 63, "minor" should be --mirror--.
In column 2, line 66, "minor" should be --mirror--.
In column 3, line 4, "minor" should be --mirror--.
In column 3, line 10, "minor" should be --mirror--.
In column 3, line 11, "minor" should be --mirror--.
In column 3, line 18, "minor" should be --mirror--.
In column 3, line 31, "minor" should be --mirror--.
In column 3, line 44, "minor" should be --mirror--.
In column 3, line 45, "minor" should be --mirror--.
In column 3, line 49, "minor" should be --mirror--.
In column 3, line 49, "minor" should be --mirror--.
In column 3, line 55, "minor" should be --mirror--.
In column 3, line 60, "minor" should be --mirror--.
In column 3, line 63, "minor" should be --mirror--.
In column 3, line 65, "minor" should be --mirror--.
In column 3, line 66, "minor" should be --mirror--.
In column 3, line 67, "minor" should be --mirror--.
In column 4, line 6, "minor" should be --mirror--.
In column 4, line 11, "minor" should be --mirror--.
In column 4, line 23, "minor" should be --mirror--.
In column 4, line 28, "minor" should be --mirror--.
In column 4, line 30, "minor" should be --mirror--.
In column 4, line 35, "minor" should be --mirror--.
In column 4, line 36, "minor" should be --mirror--.
In column 5, line 21, "minor" should be --mirror--.
In column 5, line 42, "minor" should be --mirror--.
In column 5, line 64, "minors" should be --mirrors--.
In column 6, line 4, "minor" should be --mirror--.
In column 6, line 8, "minor" should be --mirror--.
In column 6, line 39, "minor" should be --mirror--.
In column 6, line 42, "minor" should be --mirror--.
In column 7, line 23, "minors" should be --mirrors--.
In column 7, line 24, "minors" should be --mirrors--.
In column 7, line 26, "minor" should be --mirror--.

CERTIFICATE OF CORRECTION (continued)
U.S. Pat. No. 8,567,969 B2

In column 7, line 28, "minor" should be --mirror--.
In column 7, line 32, "minor" should be --mirror--.
In column 7, line 53, "minor" should be --mirror--.
In column 7, line 65, "minor" should be --mirror--.
In column 8, line 4, "minor" should be --mirror--.
In column 8, line 5, "minor" should be --mirror--.
In column 8, line 13, "minor" should be --mirror--.
In column 8, line 15, "minor" should be --mirror--.
In column 8, line 22, "minor" should be --mirror--.
In column 8, line 32, "minor" should be --mirror--.
In column 8, line 38, "minor" should be --mirror--.
In column 8, line 48, "minor" should be --mirror--.
In column 8, line 52, "minor" should be --mirror--.
In column 8, line 56, "minor" should be --mirror--.
In column 9, line 16, "minor" should be --mirror--.
In column 9, line 30, "minor" should be --mirror--.
In column 9, line 32, "minor" should be --mirror--.
In column 9, line 35, "minor" should be --mirror--.
In column 9, line 37, "minor" should be --mirror--.
In column 9, line 47, "minor" should be --mirror--.
In column 9, line 48, "minor" should be --mirror--.
In column 9, line 50, "minor" should be --mirror--.
In column 9, line 51, "minor" should be --mirror--.
In column 9, line 60, "minor" should be --mirror--.
In column 9, line 64, "minor" should be --mirror--.
In column 10, line 1, "minor" should be --mirror--.
In column 10, line 4, "minor" should be --mirror--.
In column 10, line 7, "minor" should be --mirror--.
In column 10, line 15, "minor" should be --mirror--.
In column 10, line 16, "minor" should be --mirror--.
In column 10, line 24, "minors" should be --mirrors--.
In column 10, line 38, "minor" should be --mirror--.
In column 10, line 56, "minor" should be --mirror--.
In column 10, line 58, "minor" should be --mirror--.
In column 10, line 67, "minor" should be --mirror--.

CERTIFICATE OF CORRECTION (continued)
U.S. Pat. No. 8,567,969 B2

In column 11, line 35, "minor" should be --mirror--.
In column 11, line 44, "minor" should be --mirror--.
In column 12, line 1, "minor" should be --mirror--.
In column 12, line 2, "minor" should be --mirror--.
In column 12, line 3, "minor" should be --mirror--.
In column 12, line 6, "minor" should be --mirror--.
In column 12, line 16, "minor" should be --mirror--.
In column 12, line 18, "minor" should be --mirror--.
In column 12, line 25, "minor" should be --mirror--.
In column 12, line 25, "minor" should be --mirror--.
In column 12, line 37, "minor" should be --mirror--.
In column 12, line 43, "minor" should be --mirror--.
In column 12, line 57, "minor" should be --mirror--.
In column 12, line 62, "minors" should be --mirrors--.

In the Claims:

In column 13, line 18, claim number 1 "minor" should be --mirror--.
In column 13, line 19, claim number 1 "minor" should be --mirror--.
In column 13, line 28, claim number 1 "minor" should be --mirror--.
In column 13, line 45, claim number 6 "minor" should be --mirror--.
In column 13, line 49, claim number 6 "minor" should be --mirror--.
In column 13, line 49, claim number 6 "minor" should be --mirror--.
In column 13, line 53, claim number 7 "minor" should be --mirror--.
In column 13, line 54, claim number 7 "minor" should be --mirror--.
In column 13, line 58, claim number 8 "minor" should be --mirror--.
In column 14, line 5, claim number 9 "minor" should be --mirror--.
In column 14, line 13, claim number 10 "minor" should be --mirror--.
In column 14, line 14, claim number 10 "minor" should be --mirror--.
In column 14, line 21, claim number 11 "minor" should be --mirror--.
In column 14, line 22, claim number 11 "minor" should be --mirror--.
In column 14, line 25, claim number 11 "minor" should be --mirror--.
In column 14, line 26, claim number 11 "minor" should be --mirror--.
In column 14, line 51, claim number 15 "minor" should be --mirror--.
In column 14, line 55, claim number 16 "minor" should be --mirror--.

CERTIFICATE OF CORRECTION (continued)
U.S. Pat. No. 8,567,969 B2

In column 14, line 56, claim number 16 "minor" should be --mirror--.

In column 14, line 60, claim number 16 "minor" should be --mirror--.